US012750320B2

(12) United States Patent
Tse et al.

(10) Patent No.: US 12,750,320 B2
(45) Date of Patent: Sep. 29, 2026

(54) METHOD AND SYSTEM FOR A NETWORK CONGESTION SERVICE

(71) Applicant: Verizon Patent and Licensing Inc., Basking Ridge, NJ (US)

(72) Inventors: Lap Tse, Marietta, GA (US); Mark T. Watts, Newport, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 50 days.

(21) Appl. No.: 18/814,987

(22) Filed: Aug. 26, 2024

(65) Prior Publication Data

US 2026/0058914 A1 Feb. 26, 2026

(51) Int. Cl.
*H04L 47/32* (2022.01)
*H04L 45/00* (2022.01)
*H04L 47/122* (2022.01)

(52) U.S. Cl.
CPC ............ *H04L 47/323* (2013.01); *H04L 45/22* (2013.01); *H04L 47/122* (2013.01)

(58) Field of Classification Search
CPC ...... H04L 47/323; H04L 45/22; H04L 47/122
See application file for complete search history.

(56) References Cited

U.S. PATENT DOCUMENTS 6,904,015 B1 * 6/2005 Chen ..................... H04L 47/326 370/429
7,046,665 B1 * 5/2006 Walrand .............. H04L 47/2441 370/395.5
7,133,362 B2 * 11/2006 Chu ........................ H04L 65/80 370/413
7,706,353 B2 * 4/2010 Roy ........................ H04L 45/22 370/351
10,069,748 B2 * 9/2018 Shpiner ................... H04L 47/10
10,932,306 B2 * 2/2021 Zee ................... H04W 28/0861
11,290,395 B1 * 3/2022 Goldman .............. H04L 49/206
11,528,227 B1 * 12/2022 Seely ...................... H04L 47/32
11,558,298 B2 * 1/2023 Leib ........................ H04L 49/25
11,855,901 B1 * 12/2023 Kwan ................. H04L 47/2441
2003/0088690 A1 * 5/2003 Zuckerman ............. H04L 47/32 709/232
2003/0123447 A1 * 7/2003 Smith ..................... H04L 47/34 370/412
2005/0157641 A1 * 7/2005 Roy ........................ H04L 45/22 370/228
2007/0008884 A1 * 1/2007 Tang ..................... H04L 47/283 370/230

(Continued)

FOREIGN PATENT DOCUMENTS

WO WO-2024165147 A1 * 8/2024 ........ H04W 28/0284

*Primary Examiner* — Jimmy H Tran

(57) ABSTRACT

A method, a network device, and a non-transitory computer-readable storage medium are described in relation to an network congestion service. The service includes adding bits to a packet that indicate a priority for dropping the packet when there is congestion. The service may add the bits to an Internet Protocol header of the packet. The service may also include re-routing the packet based on the drop packet priority value indicated by the added bits. The service may select an alternate communication path during congestion based on the value of the added bits. The service may also include adding a token to a packet that validates the added bits and their value.

20 Claims, 10 Drawing Sheets

(56) References Cited

U.S. PATENT DOCUMENTS

| | | | | |
|---|---|---|---|---|
| 2009/0135729 | A1* | 5/2009 | Saffre | H04L 45/302 370/252 |
| 2014/0301195 | A1* | 10/2014 | Briscoe | H04L 47/11 370/230.1 |
| 2016/0021017 | A1* | 1/2016 | Thubert | H04L 47/28 370/235 |
| 2017/0048144 | A1* | 2/2017 | Liu | H04L 47/122 |
| 2017/0171099 | A1* | 6/2017 | Shpiner | H04W 28/02 |
| 2017/0214623 | A1* | 7/2017 | Finkelstein | H04L 41/5025 |
| 2018/0097853 | A1* | 4/2018 | Wiley | H04L 45/22 |
| 2019/0089644 | A1* | 3/2019 | Shpiner | H04L 49/30 |
| 2019/0208555 | A1* | 7/2019 | Zee | H04W 76/12 |
| 2019/0253351 | A1* | 8/2019 | Ihlar | G06F 13/00 |
| 2020/0145331 | A1* | 5/2020 | Bhandari | H04L 45/22 |
| 2020/0328981 | A1* | 10/2020 | Ghanwani | H04L 47/522 |
| 2021/0112436 | A1* | 4/2021 | Hoffner | H04L 41/5025 |
| 2021/0168075 | A1* | 6/2021 | Leib | H04L 47/12 |
| 2021/0400537 | A1* | 12/2021 | Zhang | H04L 47/28 |
| 2021/0409335 | A1* | 12/2021 | Zhu | H04L 47/24 |
| 2022/0038374 | A1* | 2/2022 | Koral | H04L 47/11 |
| 2022/0124043 | A1* | 4/2022 | Zhu | H04L 47/2475 |
| 2022/0141148 | A1* | 5/2022 | Patil | H04L 47/30 370/230.1 |
| 2022/0210075 | A1* | 6/2022 | Musleh | H04L 47/30 |
| 2023/0079715 | A1* | 3/2023 | Seely | H04L 47/12 370/235 |
| 2023/0188447 | A1* | 6/2023 | Alleyne | H04L 47/30 709/224 |
| 2023/0198896 | A1* | 6/2023 | Zhou | H04B 10/271 370/392 |
| 2023/0344772 | A1* | 10/2023 | Johansson | H04L 47/30 |
| 2024/0039852 | A1* | 2/2024 | Matthews | H04L 47/56 |
| 2024/0056885 | A1* | 2/2024 | Zhu | H04W 76/15 |
| 2024/0129260 | A1* | 4/2024 | Farrokhbakht | H04L 45/22 |
| 2024/0146655 | A1* | 5/2024 | Jaiswal | H04L 43/0882 |
| 2024/0205738 | A1* | 6/2024 | Shilov | H04W 4/70 |
| 2024/0224114 | A1* | 7/2024 | Watts | H04W 28/0284 |
| 2024/0267792 | A1* | 8/2024 | Zhu | H04W 28/0236 |
| 2024/0414089 | A1* | 12/2024 | Nainar | H04L 45/12 |
| 2024/0414582 | A1* | 12/2024 | Taneja | H04W 28/0268 |
| 2025/0106680 | A1* | 3/2025 | Patil | H04W 28/0263 |
| 2025/0133023 | A1* | 4/2025 | Östberg | H04W 28/0289 |
| 2025/0150402 | A1* | 5/2025 | Östberg | H04L 47/33 |
| 2025/0220494 | A1* | 7/2025 | He | H04W 28/0268 |
| 2025/0227548 | A1* | 7/2025 | Talebi Fard | H04W 28/0268 |
| 2025/0240250 | A1* | 7/2025 | Taft | H04W 28/0236 |
| 2025/0274806 | A1* | 8/2025 | Talebi | H04W 28/0289 |
| 2025/0274810 | A1* | 8/2025 | Talebi | H04W 28/02 |
| 2025/0358671 | A1* | 11/2025 | Kanamarlapudi | H04W 28/0268 |
| 2025/0358673 | A1* | 11/2025 | Goel | H04W 28/0284 |

* cited by examiner

METHOD AND SYSTEM FOR A NETWORK CONGESTION SERVICE

BACKGROUND

Various mechanisms and technologies may be used to ensure the delivery of certain performance metrics, such as minimal latency and packet loss, as well as high throughput and other types of network performance criteria. Low latency, low loss, and scalable throughput (L4S) is a technology whose aim is to drastically reduce latency experienced by packets, support high throughput, and provide rate adaptation management mechanisms that reduce network congestion.

DETAILED DESCRIPTION

Figure 1:
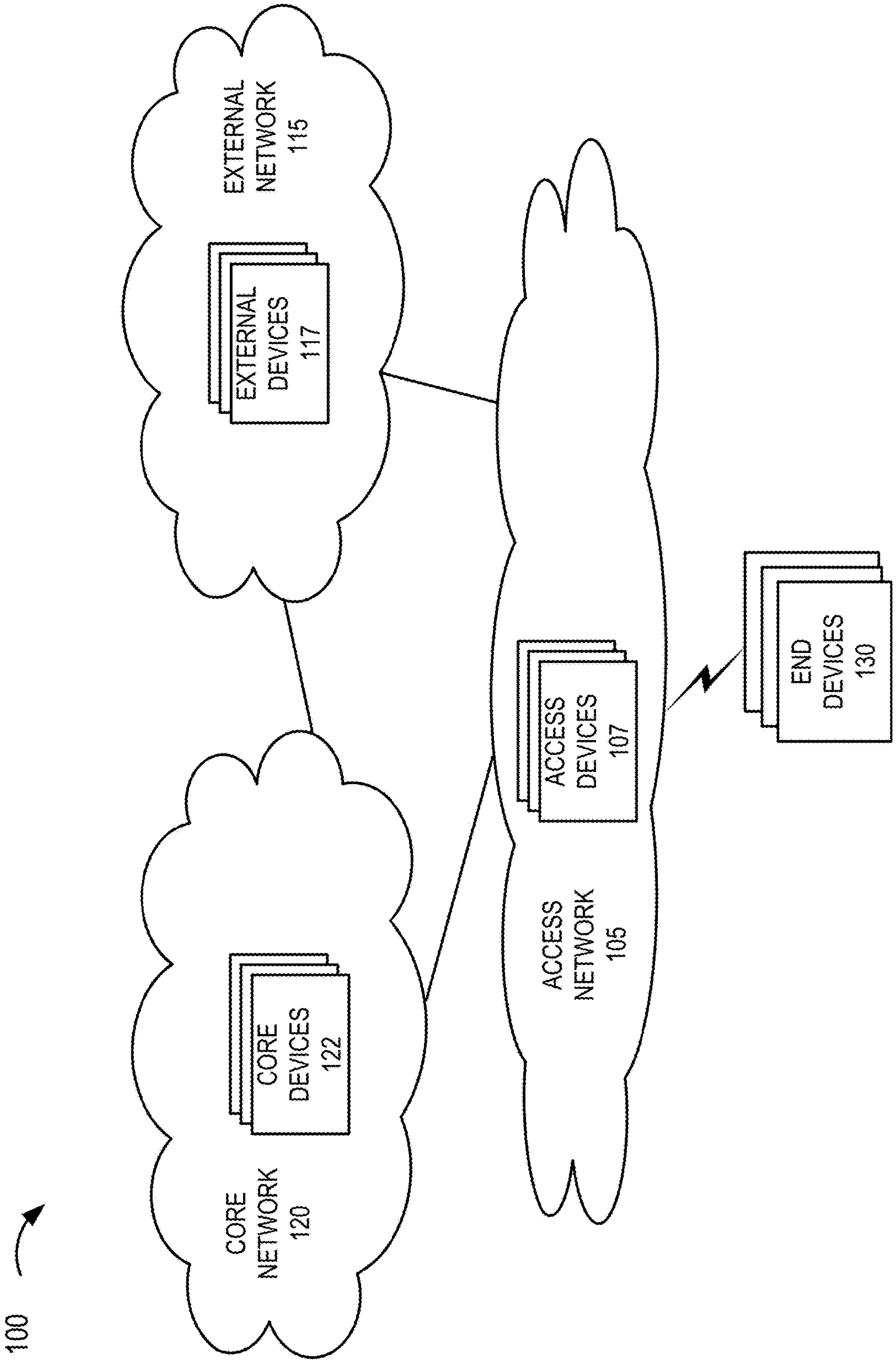
FIG. 1 is a diagram illustrating an exemplary environment in which an exemplary embodiment of an network congestion service may be implemented.

The following detailed description refers to the accompanying drawings. The same reference numbers in different drawings may identify the same or similar elements. Also, the following detailed description does not limit the invention.

L4S mechanisms may drastically reduce latency experienced by packets and may support high throughput. L4S may provide fast rate adaptation management and may reduce network congestion, queuing, and packet loss. An Explicit Congestion Notification (ECN) scheme at the Internet Protocol (IP) layer may be used to support L4S. Typically, L4S mechanisms may be applied independently to different cross-sections of the network, such as a radio access network (RAN), a core network, a transport network, and a user IP layer, primarily due to different protocols used such as tunneling, headers, and other factors.

Network congestion can result in too long of a cure time and/or packet loss. For example, Transport Control Protocol (TCP) and Internet Protocol (IP) networks signal congestion by dropping packets, and routing protocols may take too long to converge.

The length of the cure time may relate to several factors. For example, for service-based interface (SBI) architectures, Hypertext Transfer Protocol (HTTP)/2 operates at application layer 7 of the Open Systems Interconnection (OSI) model while congestion is at IP layer 3 and Transport layer 4. Additionally, various architectures, network devices, and protocol stacks, such as a control plane and user plane separation (CUPS) architecture, SBI, a Path Computation Engine (PCE), Fifth Generation (5G) Core network devices, segment routing (SR), and Two-Way Active Measurement Protocol (TWAMP), are siloed and work at different layers relative to L4S. The length of cure time may relate to other factors, such as available resources of a network device to identify congestion and generate load control information (LCI) and overload control information (OCI), for example.

Control plane messaging, such as 5G core control plane messaging may be short and bursty so minimizing packets being dropped can be critical. For example, dropped packets in the control plane can result in race conditions, which may cause 5G core network internal timers to trip and lead to control plane failures rippling to user plane failures, such as session establishment failures, and the like.

In view of the above, during network congestion, there is a need to improve the delivery success rate of control plane messaging. Additionally, there is a further need to approach a more deterministic transit time of control plane messaging so as to reduce or prevent race conditions and time-outs.

According to exemplary embodiments, a network congestion service is described herein. According to an exemplary embodiment, the network congestion service may be implemented by one or multiple types of networks. For example, the network may be implemented as a core network, a radio access network (RAN), an external network, or another type of network, as described herein.

According to an exemplary embodiment, a network device, such as a core network device, a RAN device, an external device, another type of network device, or a combination of different types of network devices, as described herein, may include logic of an exemplary embodiment of the network congestion service. According to an exemplary embodiment, the network congestion service may pertain to control plane messaging. A control plane message may include one or multiple packets.

According to an exemplary embodiment, the network congestion service may include a packet dropping subservice. According to an exemplary embodiment, the network congestion service may add bits to a packet that indicate a priority for dropping the packet when there is congestion, as described herein. According to an exemplary embodiment, the network congestion service may add (priority drop) bits to the IP header of the packet. According to an exemplary implementation, the (priority drop) bits may be added to the Type of Service (ToS) field of an IPv4 header or a Traffic Class (TC) field of an IPv6 header. For example, similar to Explicit Congestion Notification (ECN), the bits may be added to the two least-significant bits in the ToS field or the TC field.

According to other exemplary implementations, the priority drop bits may be added to an options field or an extension header of the IP header. According to such an exemplary implementation, an L4S/ECN bit scheme (e.g., 00—not ECN-capable; 01—ECN Capable; 10—ECN Capable; 11—Congestion Experienced, or another ECN bit scheme) may be included in the ToS/TC field and the priority drop bits may be included in the options field or the extension header. According to various exemplary scenarios, depending on the level of priority for dropping, the packet may be dropped during congestion or may be transmitted to another network device despite congestion (e.g., not dropped).

According to an exemplary embodiment, the network congestion service may include a re-routing sub-service. According to an exemplary embodiment, the network congestion service may re-route (e.g., relative to a primary communication path or current/actively using communication path) a packet to a secondary communication path based on the priority bits, as described herein. For example, when a primary communication path is congested, a network device may determine whether to drop the packet (or delay the transmission of the packet) or transmit the packet along a secondary communication path (e.g., that is not congested or to a lesser degree) based on the priority bits included in the packet.

According to an exemplary embodiment, the re-routing sub-service may include use of the Stream Control Transmission Protocol (SCTP) and associated multihoming to establish multiple communication paths and addresses (e.g., a primary IP address and one or multiple secondary IP addresses) between network devices. According to exemplary embodiment, the re-routing sub-service may use TWAMP as a basis to calculate round-trip metrics associated with a communication path. According to various exemplary embodiments, a network controller device (e.g., a path computation engine (PCE) device, a service communication proxy (SCP) device, an SCTP device, etc.) may assist or make available to a network device of the re-routing sub-service, information regarding a communication path (e.g., IP address, congestive state, round trip time (RTT), or the like), which may be used to select an alternate communication path during congestion, as described herein.

According to an exemplary embodiment, the network congestion service may include a trusted sub-service. According to an exemplary embodiment, the trusted sub-service may provide a token, a key, or another instance of data that may be used as a basis to honor a drop packet priority value. For example, the trusted sub-service may prevent malicious indications of congestion and afford proper application of the network congestion service to a control plane message, packet, and/or a network device during congestion.

In view of the foregoing, the network congestion service may improve transport of control plane messaging during congestive states. The network congestion service may enable the management of dropped packets and provide a more reliable and deterministic handling of control plane packets during congestion. The network congestion service may prioritize control plane messages in a manner that may support different gradations of application services (e.g., critical applications versus non-critical applications, etc.) and network procedures (e.g., PDU session establishment, handover, registration, etc.) and improve meeting service level agreement (SLA) requirements and other performance-related metrics.

FIG. 1 is a diagram illustrating an exemplary environment 100 in which an exemplary embodiment of a network congestion service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network, or another type of network that may support a wireless service and/or an end device application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane (CP), a user plane (UP), a service plane, and a network management plane. Environment 100 may include other types of planes of communication. A message communicated in support of the network congestion service may use at least one of these planes of communication. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface (e.g., proprietary, etc.).

Access network 105 may include one or multiple networks of one or multiple types and technologies. For example, access network 105 may be implemented to include a Fifth Generation (5G) RAN, a future generation RAN (e.g., a Sixth Generation (6G) RAN, a Seventh Generation (7G) RAN, etc.), a centralized-RAN (C-RAN), an Open-RAN (O-RAN), and/or another type of access network. Access network 105 may include a legacy RAN (e.g., a Third Generation (3G) RAN, a Fourth Generation (4G)

RAN, etc.). Access network 105 may communicate with and/or include other types of access networks, such as, for example, a Wi-Fi network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105 and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a Next Generation Core (NGC)/5G core network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.). Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced LTE (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), a transport device (e.g., a router or similar network device that may support a transport layer protocol (e.g., user datagram protocol (UDP), transmission control protocol (TCP), QUIC, Real-time Transport Protocol (RTP), etc.), and/or some sub-combination such access devices 107.

Access device 107 may include other types of wireless access devices, such as a Wi-Fi device, a hotspot device, and/or a fixed wireless access customer premise equipment (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple RATs (e.g., 4G and 5G functionality, 5G and 5.5G functionality, 5G and 6G), etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

According to some exemplary embodiments, at least some of access devices 107, as described herein, include an exemplary embodiment of the network congestion service.

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, transport devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, such application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, online gaming, web services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and the like. External devices 117 may include non-virtual, logical, and/or physical network devices.

According to some exemplary embodiments, at least some of external devices 117, as described herein, include an exemplary embodiment of the network congestion service.

Core network 120 may include one or multiple networks of one or multiple network types and technologies. Core network 120 may include a complementary network of access network 105. For example, core network 120 may be implemented to include a 5G core network, a 5G Advanced core network, an EPC of an LTE network, an LTE-Advanced (LTE-A) network, and/or an LTE-A Pro network, a future generation core network (e.g., a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a security anchor function (SEAF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a wireless access gateway (WAG), a tunnel termination gateway (TTG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), a charging system (CS), a transport device, and/or a future generation core device 122 that may perform a similar function.

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 6G, 6G and 7G, etc.), such as an SMF with PGW control plane functionality (e.g., SMF+PGW-C), a UPF with PGW user plane functionality (e.g., UPF+PGW-U), and/or other combined nodes (e.g., an HSS with a UDM/UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to some exemplary embodiments, at least some of core devices 122, as described herein, include an exemplary embodiment of the network congestion service.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, an autonomous vehicle, or another type of wireless device (e.g., another type of user equipment (UE)). End device 130 may be configured to execute diverse types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

Figure 2:
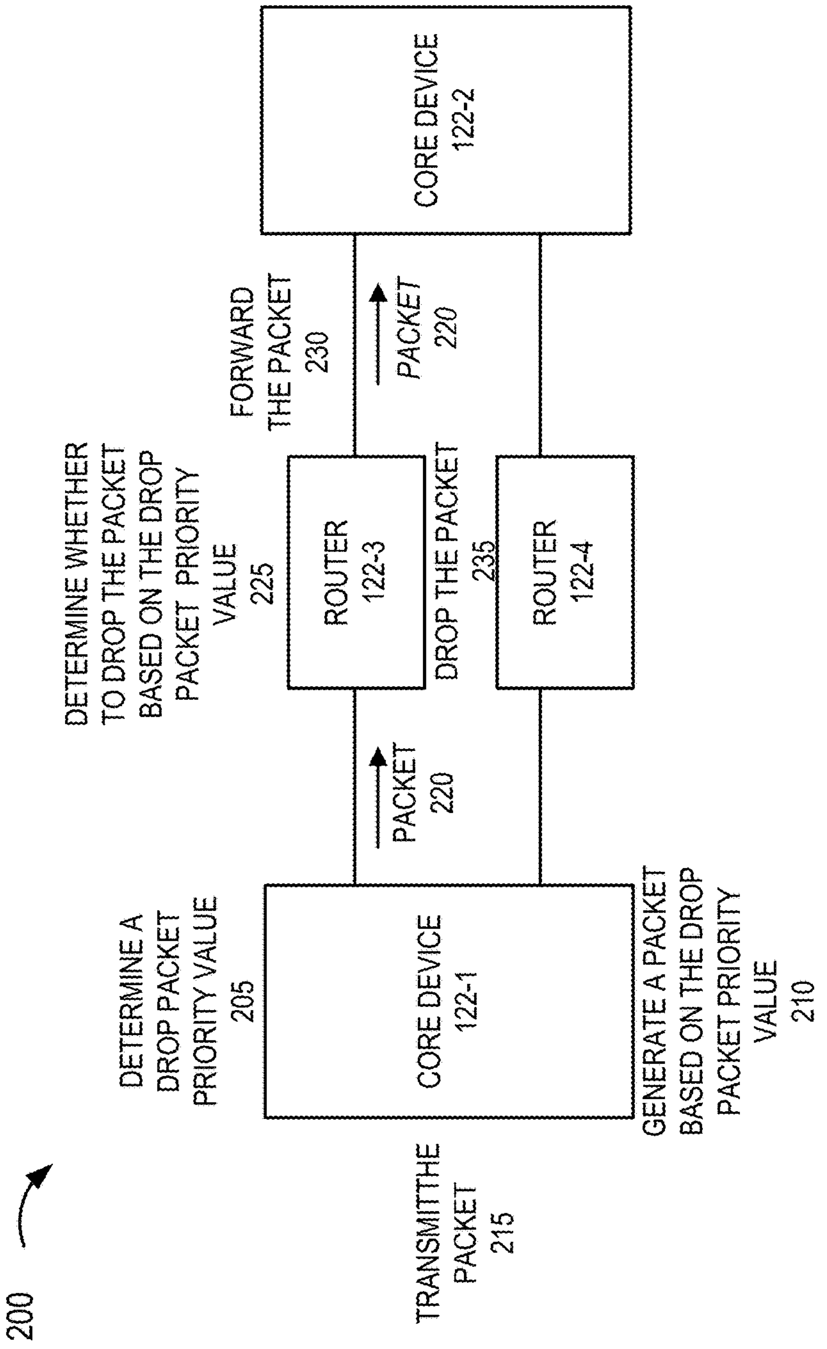
FIG. 2 is a diagram illustrating an exemplary process of an exemplary embodiment of the network congestion service implemented in an exemplary environment.

FIG. 2 is a diagram illustrating an exemplary process 200 of an exemplary embodiment of the network congestion service implemented in an exemplary environment. According to this example, the exemplary environment may be implemented in core network 120 that includes core devices 122-1 and 122-2. For example, core device 122-1 and 122-2 may be implemented as an SMF and an AMF or another combination of different types of core devices 122, as described herein. Routers 122-3 and 122-4 may be implemented as a network router or another type of layer 3 network device. The number of routers are exemplary. Also, the number and the configuration of the communication paths and segments are also exemplary.

Referring to FIG. 2 and process 200, core device 122-1 may determine a drop packet priority value 205 for a packet. For example, core device 122-1 may be triggered or invoked to generate and transmit a packet associated with a control plane message. The control plane message may relate to end device 130 and a network procedure, for example. In response to or based on the invocation, core device 122-1 may determine the drop packet priority value 205 for the packet based on one or multiple criteria. For example, the criterion may relate to subscription information pertaining to end device 130 and the associated packet of the control plane message. For example, a user may be afforded the network congestion service and/or a drop packet priority based on a tier of the user's wireless network service. According to another example, the criterion may relate to a category or type of an application to which the packet of the control plane message may pertain. For example, a control plane message pertaining to the setup of a PDU session associated with a critical application (e.g., health-related service, etc.) may be afforded a different drop packet priority value compared to web surfing or video streaming. According to yet another example, the 5G Quality of Service identifier (5QI) value associated with the application may be correlated to a drop packet priority value. According to yet other examples, the criterion may relate to the type of control plane message and/or type of underlying network procedure.

For example, different types of control plane messages and/or associated network procedures may be afforded different drop packet priority values.

As previously described, according to an exemplary embodiment, the network congestion service may add two bits to the packet (e.g., in the IP header of the packet) to indicate a drop packet priority value. According to various exemplary embodiments, the number of priority levels for dropping may be three or four depending on the configuration. For example, according to an exemplary implementation, three of the four combination values of the two bits may indicate a distinct level of priority (e.g., normal, high, and higher) and the last combination value may indicate a priority (e.g., high or higher) that is recognized only when the packet includes a trusted token or key, for example. According to another exemplary implementation, the four values of the two bits may each indicate a distinct level of priority (e.g., normal, high, higher, highest). In this regard, the drop packet priority value may indicate a priority level from among multiple priority levels for which a packet may not be dropped (or conversely dropped). According to some exemplary embodiments, the priority for dropping the packet may be relative to a user plane packet. For example, the priority for dropping a control plane packet may be less than, equal to, or have a higher priority than a user plane packet.

Core device 122 may generate the packet based on the drop packet priority value 210. For example, core device 122 may include the drop packet priority value in the packet. According to an exemplary embodiment, the drop packet priority value may be included in the IP header of the packet (e.g., the ToS field or the TC field), as described herein. According to other exemplary embodiments, the drop packet priority value may be include in the options field or an extension header of the IP header of the packet, as described herein.

Core device 122 may transmit the packet 215. For example, core device 122 may transmit the packet 215 toward core device 122-2 via router 122-3.

As further illustrated, router 122-3 may receive a packet 220 and determine whether to drop the packet based on the drop packet priority value 225. For example, router 122-3 may read the drop packet priority value and afford the drop packet priority indicated. As illustrated, depending on the drop packet priority value, router 122-3 may forward the packet 230 to core device 122-2 or drop the packet 235.

FIG. 2 illustrates exemplary steps or operations of process 200, however, according to other exemplary embodiments, process 200 may include additional, different, and/or fewer steps or operations than those illustrated and described in relation to FIG. 2.

Figure 3A:
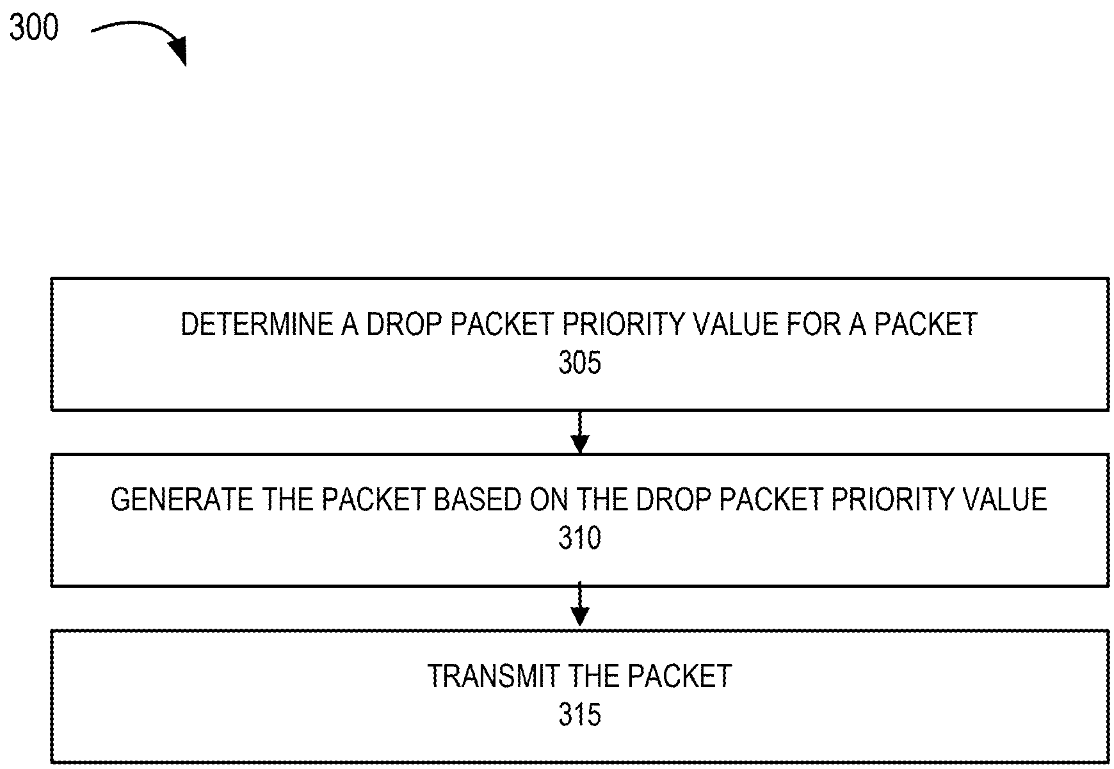
FIG. 3A is a flow diagram illustrating an exemplary process of an exemplary embodiment of the network congestion service.

FIG. 3A is a flow diagram illustrating an exemplary process 300 of an exemplary embodiment of the network congestion service. For example, process 300 may be considered a packet dropping sub-service of the network congestion service, as described herein. According to an exemplary embodiment, process 300 may be implemented by core device 122. According to other exemplary embodiments, process 300 may be implemented by access device 107 or external device 117, for example. For purposes of description, process 300 is described as being performed by core device 122.

As illustrated, in block 305, core device 122 may determine a drop packet priority value for a packet. For example, core device 122 may determine the drop packet priority value based on one or multiple criteria, as described herein. Core device 122 may determine a current (or predictive) state of congestion along a communication path using known methods (e.g., QUIC, TCP Prague, Compound TCP Cubic (CUBIC), Bottleneck Bandwidth Round-trip Propagation Time (BBR), or another type of congestion control mechanism or algorithm). According to various exemplary scenarios, core device 122 may or may not determine the presence of congestion (e.g., no congestion, low congestion, moderate congestion, high congestion, etc.).

In block 310, core device 122 may generate the packet based on the drop packet priority value. For example, core device 122 may generate the packet associated with a control plane message that includes the drop packet priority value, as described herein.

In block 315, core device 122 may transmit the packet. For example, core device 122 may transmit the packet, which includes the drop packet priority value, to or towards its destination device (e.g., another core device 122), as described herein.

FIG. 3A illustrates exemplary steps or operations of process 300, however, according to other exemplary embodiments, process 300 may include additional, different, and/or fewer steps or operations than those illustrated and described in relation to FIG. 3A.

Figure 3B:
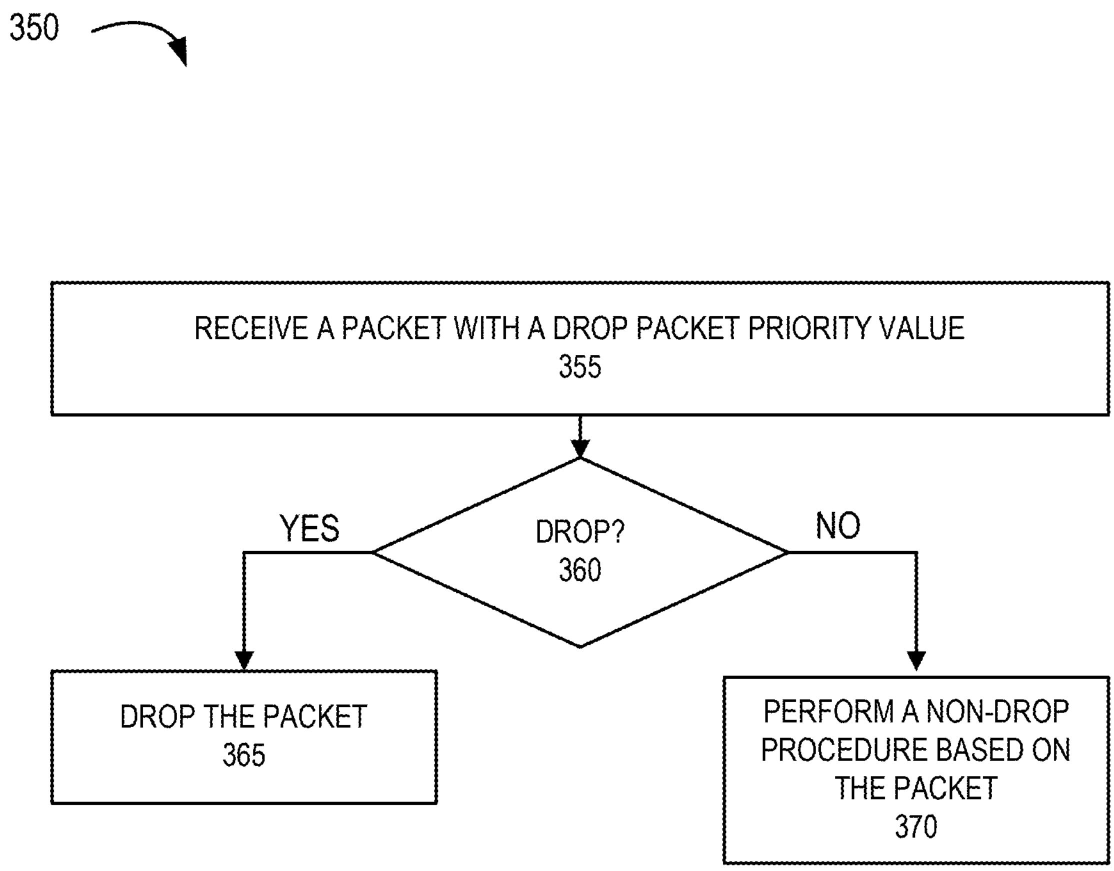
FIG. 3B is another flow diagram illustrating another exemplary process of an exemplary embodiment of the network congestion service.

FIG. 3B is another flow diagram illustrating another exemplary process 350 of an exemplary embodiment of the network congestion service. For example, process 350 may be considered a packet dropping sub-service of the network congestion service, as described herein. According to an exemplary embodiment, process 350 may be implemented by core device 122. According to other exemplary embodiments, process 300 may be implemented by access device 107 or external device 117, for example. According to some exemplary implementations, core device 122 may be implemented as a router, a switch, or another type of layer 3 (e.g., of the OSI model) or similar reference model) network device.

As illustrated, in block 355, core device 122 may receive a packet with a drop packet priority value. For example, core device 122 may receive the packet from another network device, such as another core device 122 or a network device of a different network type.

In block 360, core device 122 may determine whether to drop the packet based on the drop packet priority value. For example, core device 122 may read the drop packet priority value and afford the corresponding drop packet priority for the packet, as described herein. Core device 122 may also determine a current (or predictive) state of congestion using known methods.

When core device 122 may determine to drop the packet (block 360—YES), core device 122 may drop the packet (block 365).

When core device 122 may determine to not drop the packet (block 360—NO), core device 122 may perform a non-drop procedure on the packet (block 370). For example, core device 122 may forward the packet toward a destination device, generate and transmit a response control plane message, or perform a network operation or procedure pertaining to the packet of the control plane message (e.g., setup of a PDU session, registration of end device 130 in a network, obtain policy information pertaining to end device 130, or another type of network procedure).

FIG. 3B illustrates exemplary steps or operations of process 350, however, according to other exemplary embodiments, process 350 may include additional, different, and/or fewer steps or operations than those illustrated and described in relation to FIG. 3B.

Figure 4:
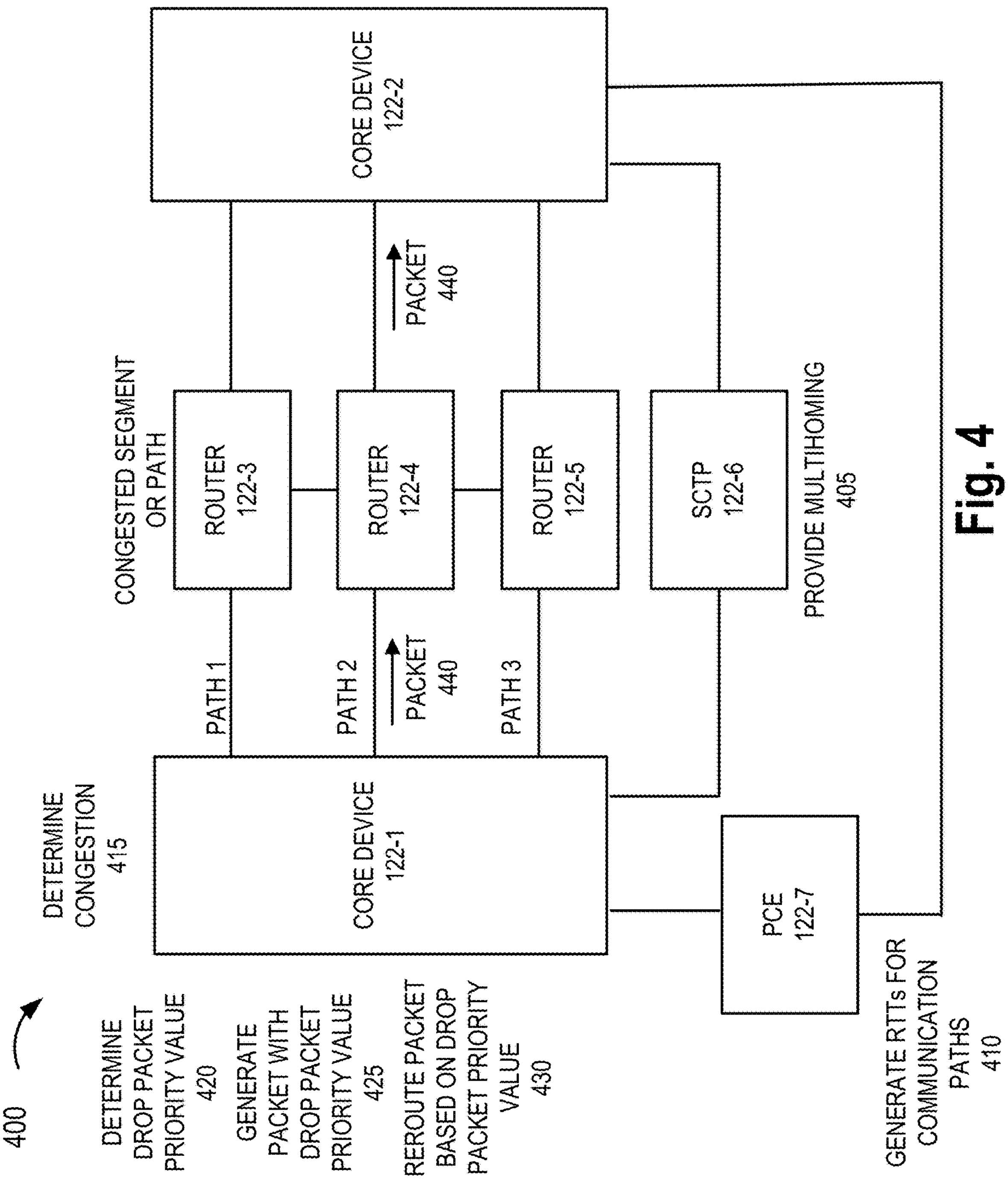
FIG. 4 is a diagram illustrating yet another exemplary process of an exemplary embodiment of the network congestion service implemented in an exemplary environment.

FIG. 4 is a diagram illustrating yet another exemplary process 400 of an exemplary embodiment of the network congestion service implemented in an exemplary environment. According to this example, the exemplary environment may be implemented in core network 120. Core devices 122-1, 122-2 and routers 122-3, 122-4 have been previously described. Router 122-5 may be considered an additional router. The number of routers are exemplary. Also, the number and the configuration of the communication paths and segments are also exemplary.

PCE 122-7 may include a network device that may ingest network topology and performance information, and based on this information may calculate RTT times or transit times for various segments or end-to-end communication paths between core devices 122. PCE 122-7 may include logic that uses TWAMP, for example, and may operate between interfaces of core devices 122, for example.

SCTP 122-6 may include a network device that may establish multiple communication paths and IP addresses between core devices 122. SCTP 122-6 may provide other services, such as flow control, congestion control, and fault tolerance.

Referring to process 400, as a part of an initial state, assume that SCTP 122-6 provides multihoming 405. For example, the multihoming 405 may include the configuration of multiple communication paths (e.g., path 1, path 2, and path 3) between core devices 122-1 and 122-2 with distinct IP addresses. According to some exemplary embodiments, the communication paths may include or be configured as a primary communication path and secondary or alternate communication paths, for example. The number and configuration of the end-to-end communication paths are exemplary. Additionally, for example, assume that PCE 122-7 has generated RTTs for each of the communication paths.

As illustrated, core device 122-1 may determine congestion 415. For example, based on information from SCTP 122-6 and/or determined independently by known methods, core device 122-1 may determine that path 1 is in a congested state (e.g., a congested segment (e.g., core device 122-1 to router 122-3) or end-to-end (e.g., communication path from core device 122-1 to core device 122-2 via router 122-3).

Core device 122-1 may determine a drop packet priority value 420 and generate a packet with the drop packet priority value 425. For example, as described herein, core device 122 may determine the drop packet priority value for a packet associated with a control plane message based on one or multiple criteria. Core device 122 may add the drop packet priority bits to the packet as a part of the generation of the packet.

Core device 122-1 may reroute the packet (relative to path 1) to an alternate path based on the drop packet priority value 430. For example, core device 122-1 may correlate the drop packet priority value to the RTTs associated with path 2 and 3. According to an exemplary embodiment, core device 122-1 may select the communication path with the least or smallest RTT for a packet that has the highest drop packet priority and select the communication path with the largest RTT for a packet that has the lowest (or lower relative to other drop packet priority values). According to other exemplary embodiments, core device 122-1 may select the communication path based on the current or prospective degree of congestion associated with a communication path. For example, in a similar manner, core device 122-1 may select the communication path with the least congestion for a packet that has the highest drop packet priority and select the communication path with higher congestion (e.g., relative to the least congested communication path) for a packet that has a lower drop packet priority value relative to other drop packet priority values. According to some exemplary embodiments, core device 122-1 may select the alternate path not based on the drop packet priority value but based on other factors (e.g., latency and/or another communication metric, degree of congestion, etc.). According to this exemplary scenario, assume that core device 122-1 reroutes the packet and transmits the packet (e.g., a packet 440) along path 2, as illustrated. As described herein, router 122-4 may perform process 350.

FIG. 4 illustrates exemplary steps or operations of process 400, however, according to other exemplary embodiments, process 400 may include additional, different, and/or fewer steps or operations than those illustrated and described in relation to FIG. 4.

Figure 5:
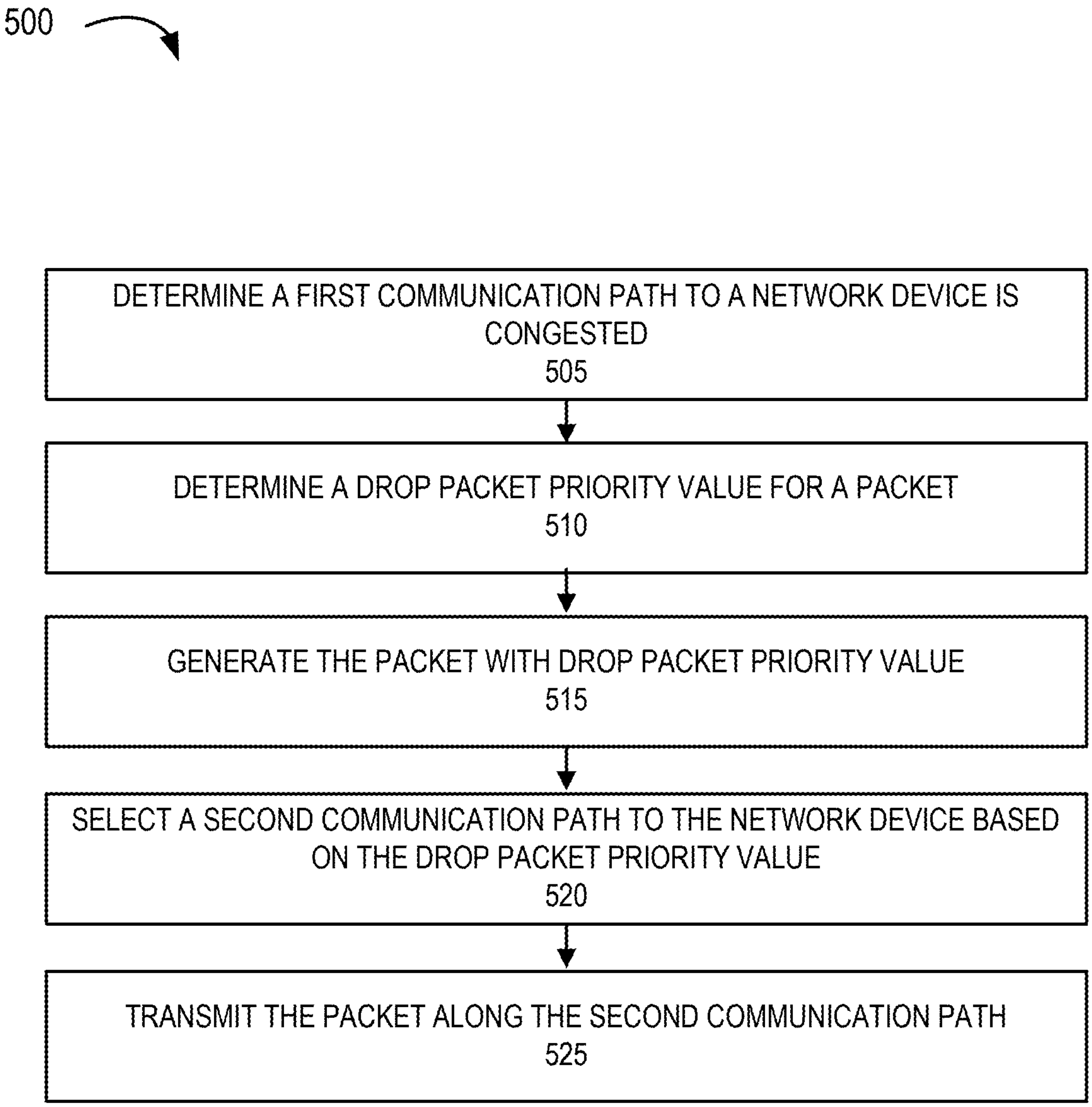
FIG. 5 is still another flow diagram illustrating still another exemplary process of an exemplary embodiment of the network congestion service.

FIG. 5 is a flow diagram illustrating an exemplary process 500 of an exemplary embodiment of the network congestion service. For example, process 500 may be considered a re-routing sub-service of the network congestion service, as described herein. According to an exemplary embodiment, process 500 may be implemented by core device 122. According to other exemplary embodiments, process 500 may be implemented by access device 107 or external device 117, for example. For purposes of description, process 500 is described as being performed by core device 122.

In block 505, core device 122 may determine a first communication path to a network device is congested.

In block 510, core device 122 may determine a drop packet priority value for a packet. For example, core device 122 may determine the drop packet priority value based on one or multiple criteria, as described herein.

In block 515, core device 122 may generate the packet based on the drop packet priority value. For example, core device 122 may generate the packet associated with a control plane message that includes the drop packet priority value, as described herein.

In block 520, core device 122 may select a second communication path to the network device based on the drop packet priority value. For example, core device 122 may select the second communication path based on a correlation between the drop packet priority value and one or multiple other alternate or candidate communication paths or segments relative to the first communication path or segment, as described herein. Additionally, or alternatively, core device 122 may select the second communication path based on the current or prospective degree of congestion and the drop packet priority value, as described herein.

In block 525, core device 122 may transmit the packet. For example, core device 122 may transmit the packet, which includes the drop packet priority value, to or towards its destination device (e.g., another core device 122), along the second communication path, as described herein.

FIG. 5 illustrates exemplary steps or operations of process 500, however, according to other exemplary embodiments, process 500 may include additional, different, and/or fewer steps or operations than those illustrated and described in relation to FIG. 5. For example, according to other exemplary scenarios, core device 122 may not reroute the packet but transmit the packet along the first communication path. As an example, when the drop packet priority value has the lowest priority drop value, core device 122 may transmit the packet along the first communication path despite the congestive state of the first communication path.

According to other exemplary embodiments, core device 122 may select the second communication path or segment to a different network device relative to the target network device of the first communication path to which the packet is to be transmitted. For example, assume that each of the communication paths to the target network device of the first communication path to which the packet is to be transmitted are congested. Core device 122 may select another target network device of the same type as the target network device and a suitable communication path. For example, referring back to FIG. 4, assume core device 122-2 is a UDM or a PCF, core device 122-1 may select another UDM or another PCF, which may be co-located with core device 122-2 or is situated at a different location relative to core device 122-2. Core device 122-1 may select another communication path or segment to reach the other UDM or the other PCF based on the packet drop value, congestion state of each candidate communication path, etc., as described herein.

As previously described, the network congestion service may include a trusted sub-service. For example, core device 122 or another type of network device (e.g., access device 107, external device 117, etc.) may request a token or similar instance of data (e.g., key, etc.) that may be used with packets of the control plane to indicate trust. For example, the token may indicate a level of trust such that the drop packet priority value may be appropriately recognized.

Figure 6A:
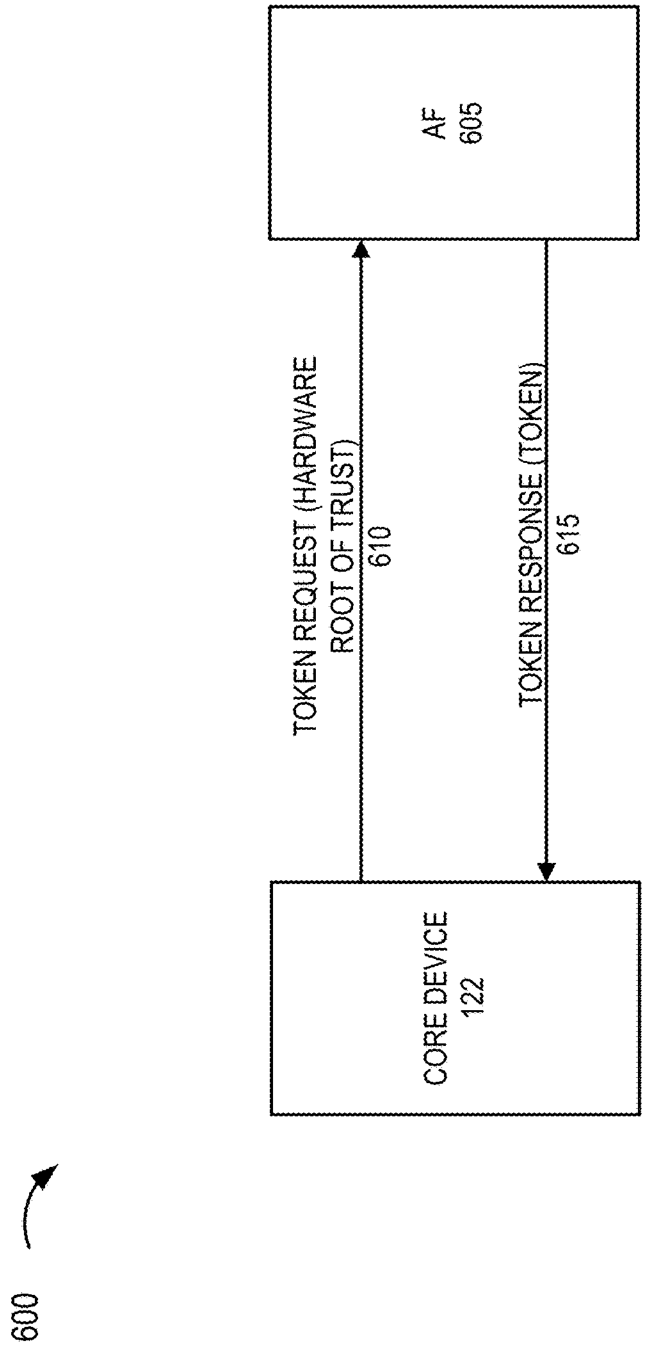
FIG. 6A is a diagram illustrating another exemplary process of an exemplary embodiment of the network congestion service implemented in an exemplary environment.

FIG. 6A is a diagram illustrating still another exemplary process 600 of the network congestion service. According to this example, the exemplary environment may be implemented in core network 120. Core device 122 has been previously described. The environment may further include an AF 605, which may also be implemented as another core device 122. AF 605 may provide a security service that includes hosting security tokens for disbursement to network devices, such as core devices 122. The security tokens may validate drop packet priority values used in packets of control plane messages associated with the network congestion service, as described herein.

Referring to FIG. 6A, core device 122 may generate and transmit a token request 610 to AF 605. Token request 610 may include unique data that may be provided by a root of trust component (e.g., system on chip (Soc), a trusted execution environment (TEE), a trusted module, etc.) of core device 122. For example, the root of trust may be implemented as a hardware root of trust (HWRoT). According to some exemplary implementations, the unique data may be a serial number, a Medium Access Control (MAC) address, a unique encrypted string or key indicative of core device 122, or the like. In response to receiving token request 610, AF 605 may determine whether token request 610 is valid or not. For example, AF 605 may validate token request 610 based on the unique data, as described herein. According to this exemplary scenario, assume that AF 605 determines that token request 610 is valid. In response, AF 605 may generate and transmit a token response 615, which includes a token, to core device 122. Core device 122 may use the token as a part of the network congestion service. For example, core device 122 may include the token in a packet associated with a control plane message, as described herein.

Although not illustrated, AF 605 may also generate and transmit a message to other network devices (e.g., PCE, SCTP, other core devices 122, etc.) that may include the token and data that validates core device 122 use of the token in relation to the network congestion service, as described herein.

Figure 6B:
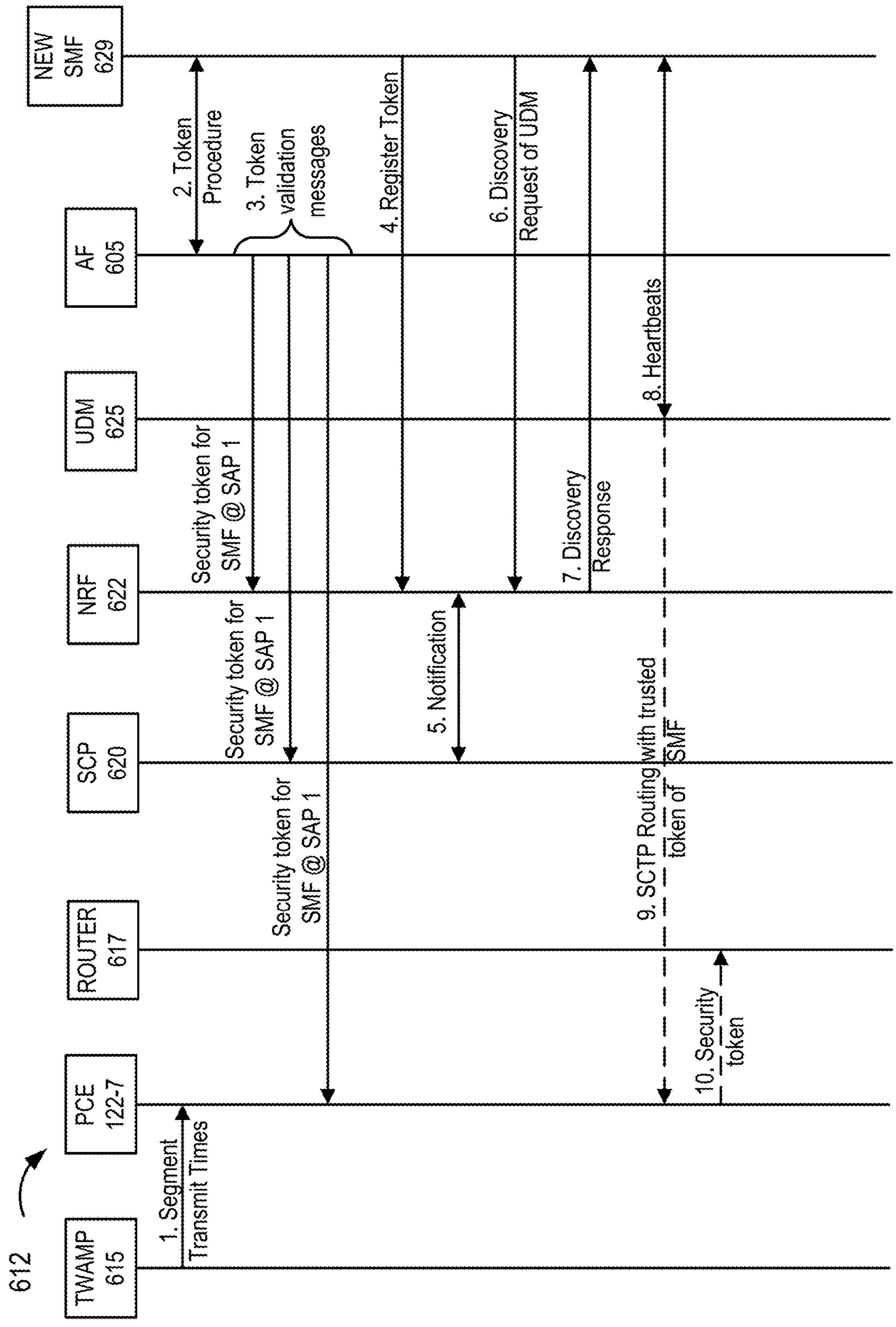
FIG. 6B is a messaging diagram illustrating yet another exemplary process of an exemplary embodiment of the network congestion service implemented in an exemplary environment.

FIG. 6B is a messaging diagram illustrating yet another exemplary process 612 of an exemplary embodiment of the network congestion service implemented in an exemplary environment. As illustrated, the exemplary environment may include a TWAMP device 615, PCE 122-7, a router 617, an SCP 620, an NRF 622, a UDM 625, AF 605, and a new SMF 629. PCE 122-7 and AF 605 has been previously described. The exemplary environment may be implemented in core network 120.

TWAMP device 615 may include a network device that includes TWAMP logic. For example, TWAMP device 615 may include multiple TWAMP agents that report segment transit times to PCE 122-7, as described herein. Router 617 may include a router that includes logic of the network congestion service. For example, router 617 may be a core device 122 that determines whether to drop a packet, reroute the packet, determine the validity of a drop packet priority value, etc., based on the drop packet priority value and/or a security token, as described herein. SCP 620 may be implemented as a service communication proxy that provides SCTP services, as described herein.

NRF 622, UDM 625, and SMF 629 may include logic and perform an operation or provide a function that is in accordance with a technical specification associated with a network standardizing body, such as Third Generation Partnership Project (3GPP), 3GPP2, International Telecommunication Union (ITU), European Telecommunications Standards Institute (ETSI), GSM Association (GSMA), or the like. Additionally, NRF 622, UDM 625, and SMF 629 may include logic of the network congestion service, as described herein. According to exemplary scenario, SMF 629 may be a newly instantiated SMF (i.e., new SMF 629) in core network 120.

The messages illustrated in FIG. 6B and described in relation to process 612 are exemplary. For the sake of brevity, some operations and/or messages, which may relate to a network standard, have been omitted. The order of steps illustrated and described in relation to process 612 are exemplary, and non-dependent steps may be performed concurrently.

Referring to FIG. 6B and process 612, in step (1), TWAMP device 615 may provide or report segment transmit times to PCE 122-7. In step (2), SMF 629 and AF 605 may perform a token procedure. For example, the token procedure may include operations and messages, as previously described in relation to FIG. 6A.

In step (3) and in response to step (2), AF 605 may generate and transmit token validation messages to one or multiple other core devices 122, such as NRF 622, SCP 620, and PCE 122-7. The token validation message may include the security token and data indicating an association of the security token to SMF 629. For example, the data may include a unique network device identifier, a port or a service access point (SAP) associated with SMF 629, and the like. In step (4), in response to obtaining the security token, SMF 629 may register the security token with NRF 622. NRF 622 may store information that associates the security token to SMF 629 and identification information relating to SMF 629, for example.

In step (5), in response to the registration procedure, NRF 622 may notify SCP 620 regarding the new SMF 629, ports and SAPs associated with SMF 629, and other relevant information. In step (6), SMF 629 may discover an available UDM from NRF 622. In step (7), NRF 622 may provide a discovery response that includes the network address of the available UDM.

In step (8), heartbeat messages associated with SCTP logic may be exchanged between UDM 625 and SMF 629. The heartbeat messages may be a part of the multihoming service of the SCTP logic that serves to indicate end point reachability associated with IP addresses, for example. In step (9), access and/or registration authorization is provided securely to PCE 122-7, and in step (10), PCE 122-7 sets up a secure/authorized path through the IP network, as necessary based on the security token.

Figure 7:
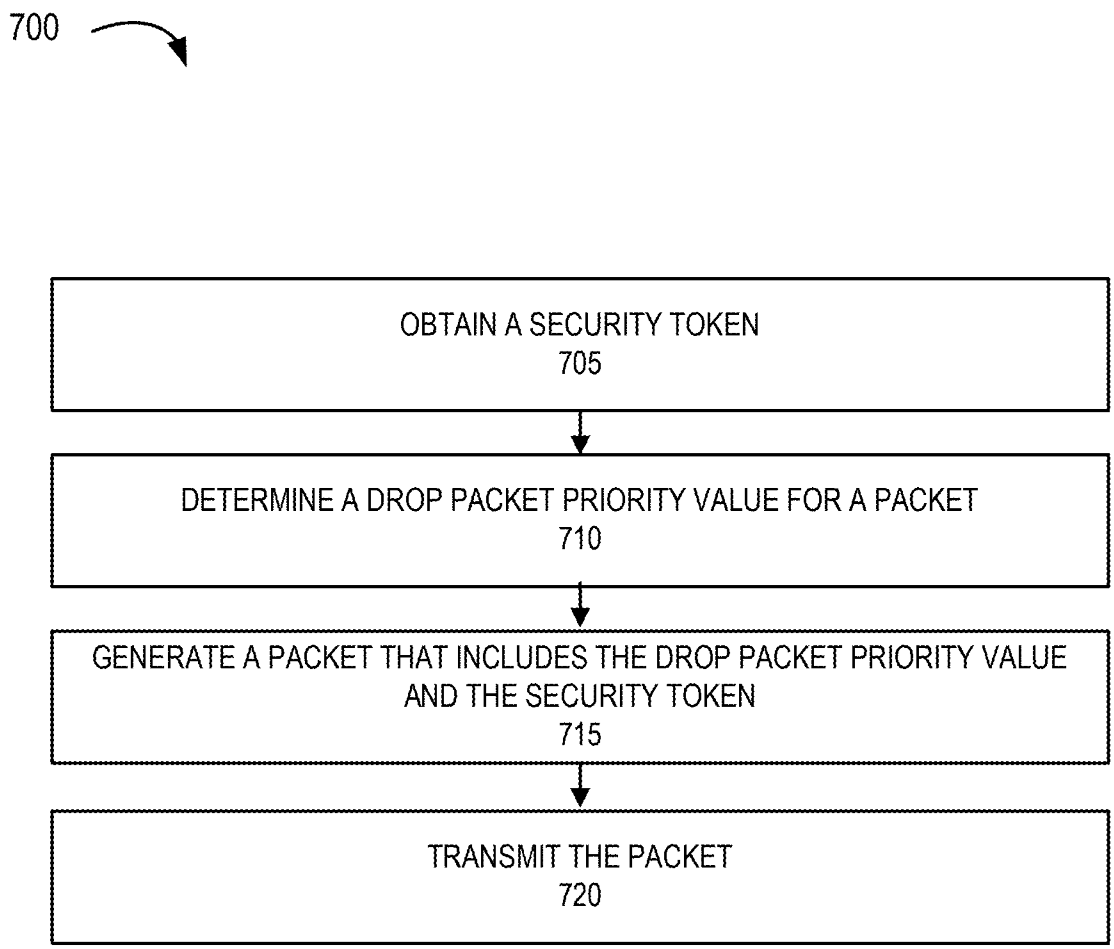
FIG. 7 is still yet another flow diagram illustrating still yet another exemplary process of an exemplary embodiment of the network congestion service.

FIG. 7 is still yet another flow diagram illustrating still yet another exemplary process of an exemplary embodiment of the network congestion service. For example, process 300 may be considered a packet dropping sub-service of the network congestion service, as described herein. According to an exemplary embodiment, process 300 may be implemented by core device 122. According to other exemplary embodiments, process 300 may be implemented by access device 107 or external device 117, for example. For purposes of description, process 300 is described as being performed by core device 122.

In block 705, core device 122 may obtain a security token. For example, as previously illustrated and described in relation to process 600 of FIG. 6A, core device 122 may request for a security token from another network device (e.g., AF 605). When the request is successfully validated, AF 605 may provide the security token to core device 122.

In block 710, core device 122 may determine a drop packet priority value for a packet. For example, core device 122 may determine the drop packet priority value based on one or multiple criteria, as described herein. Core device 122 may determine a current (or predictive) state of congestion along a communication path using known methods (e.g., QUIC, TCP Prague, Compound TCP Cubic (CUBIC), Bottleneck Bandwidth Round-trip Propagation Time (BBR), or another type of congestion control mechanism or algorithm). According to various exemplary scenarios, core device 122 may or may not determine the presence of congestion (e.g., no congestion, low congestion, moderate congestion, high congestion, etc.).

In block 715, core device 122 may generate the packet based on the drop packet priority value. For example, core device 122 may generate the packet associated with a control plane message that includes the drop packet priority value and the security token, as described herein.

In block 720, core device 122 may transmit the packet. For example, core device 122 may transmit the packet, which includes the drop packet priority value and the security token, to or towards its destination device (e.g., another core device 122), as described herein. The security token may be used by other core devices situated along a segment or communication path as a basis to validate or honor the drop packet priority value, as described herein.

FIG. 7 illustrates exemplary steps or operations of process 700, however, according to other exemplary embodiments, process 700 may include additional, different, and/or fewer steps or operations than those illustrated and described in relation to FIG. 7.

Figure 8:
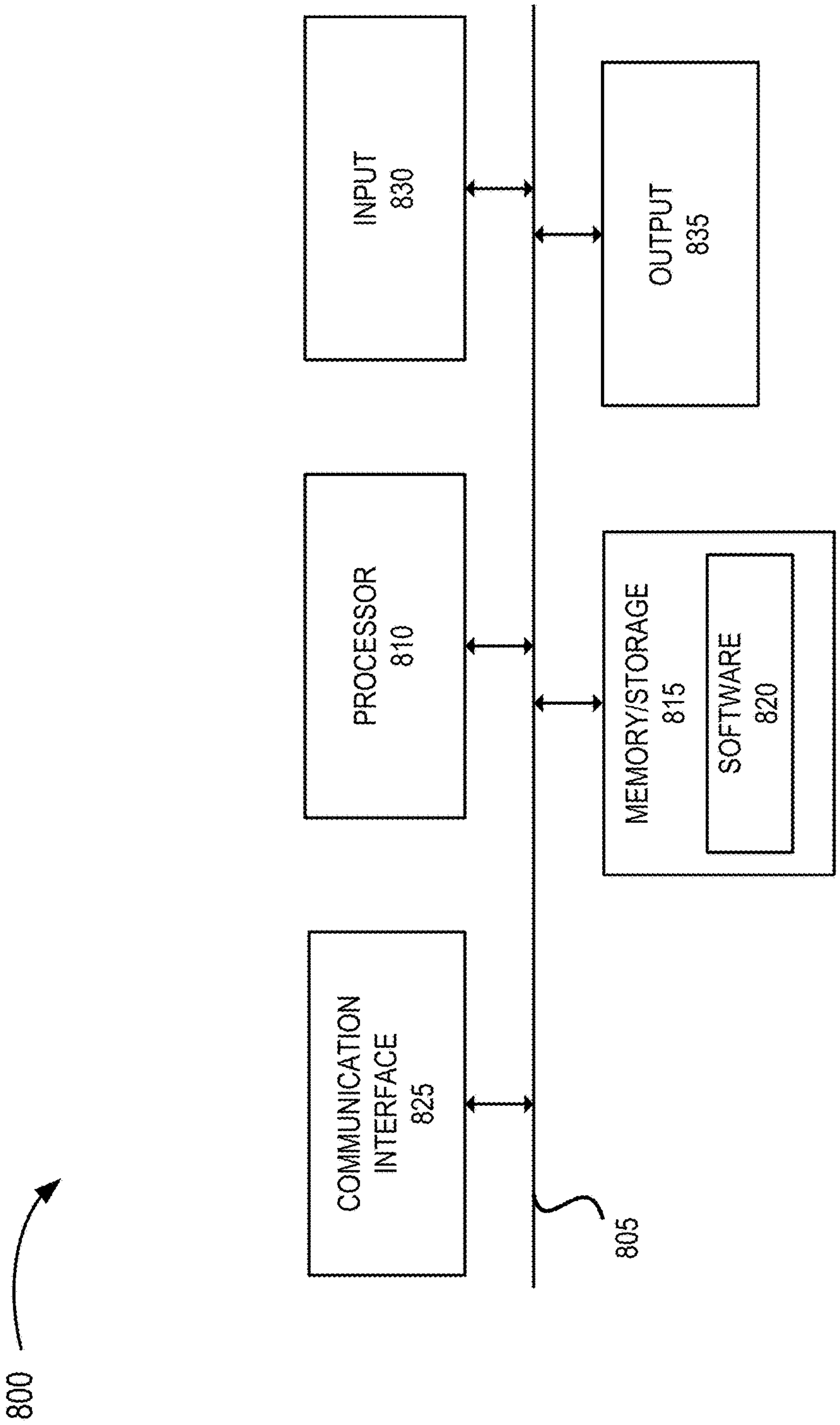
FIG. 8 is a diagram illustrating exemplary components of a device that may correspond to one or more of the devices illustrated and described herein.

FIG. 8 is a diagram illustrating exemplary components of a device 800 that may be included in one or more of the devices described herein. For example, device 800 may correspond to access device 107, external device 117, core device 122, end device 130, and/or other types of network devices, as described herein. As illustrated in FIG. 8, device 800 includes a bus 805, a processor 810, a memory/storage 815 that stores software 820, a communication interface 825, an input 830, and an output 835. According to other embodiments, device 800 may include fewer components, additional components, different components, and/or a different arrangement of components than those illustrated in FIG. 8 and described herein.

Bus 805 includes a path that permits communication among the components of device 800. For example, bus 805 may include a system bus, an address bus, a data bus, and/or a control bus. Bus 805 may also include bus drivers, bus arbiters, bus interfaces, clocks, and so forth.

Processor 810 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 810 may be implemented as hardware (e.g., a microprocessor, etc.), a combination of hardware and software (e.g., a SoC, an ASIC, etc.), may include one or multiple memories (e.g., cache, etc.), etc.

Processor 810 may control the overall operation, or a portion of operation(s) performed by device 800. Processor 810 may perform one or multiple operations based on an operating system and/or various applications or computer programs (e.g., software 820). Processor 810 may access instructions from memory/storage 815, from other components of device 800, and/or from a source external to device 800 (e.g., a network, another device, etc.). Processor 810 may perform an operation and/or a process based on various techniques including, for example, multithreading, parallel processing, pipelining, interleaving, learning, model-based, etc.

Memory/storage 815 includes one or multiple memories and/or one or multiple other types of storage mediums. For example, memory/storage 815 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 815 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 815 may be external to and/or removable from device 800, such as, for example, a Universal Serial Bus (USB) memory stick, a dongle, a hard disk, mass storage, off-line storage, or some other type of storing medium. Memory/storage 815 may store data, software, and/or instructions related to the operation of device 800.

Software 820 includes an application or a program that provides a function and/or a process. As an example, with reference to core device 122, software 820 may include an application that, when executed by processor 810, provides a function and/or a process of the network congestion service, as described herein. According to another example, with reference to access device 107, router 122-3, and external device 117, software 820 may include an application that, when executed by processor 810, provides a function and/or a process of the network congestion service, as described herein. Software 820 may also include firmware, middleware, microcode, hardware description language (HDL), and/or another form of instruction. Software 820 may also be virtualized. Software 820 may further include an operating system (OS) (e.g., Windows, Linux, Android, proprietary, etc.).

Communication interface 825 permits device 800 to communicate with other devices, networks, systems, and/or the like. Communication interface 825 includes one or multiple wireless interfaces, optical interfaces, and/or wired interfaces. For example, communication interface 825 may include one or multiple transmitters and receivers, or transceivers. Communication interface 825 may operate according to a protocol stack and a communication standard.

Input 830 permits an input into device 800. For example, input 830 may include a keyboard, a mouse, a display, a touchscreen, a touchless screen, a button, a switch, an input port, speech recognition logic, and/or some other type of visual, auditory, tactile, affective, olfactory, etc., input component. Output 835 permits an output from device 800. For example, output 835 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 800 may be implemented in the same manner. For example, device 800 may be instantiated, created, deleted, or some other operational state during its life cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 800 may be configured to perform a process and/or a function, as described herein, in response to processor 810 executing software 820 stored by memory/storage 815. By way of example, instructions may be read into memory/storage 815 from another memory/storage 815 (not shown) or read from another device (not shown) via communication interface 825. The instructions stored by memory/storage 815 may configure device 800 and/or cause processor 810 to perform a function or a process described herein. Alternatively, for example, according to other implementations, device 800 may be configured to perform a function or a process described herein based on the execution of hardware (processor 810, etc.).

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/of" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 3A, 3B, 5, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 810, etc.), or a combination of hardware and software (e.g., software 820).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 810) of a device. A non-transitory storage medium includes one or more of the storage mediums described in relation to memory/storage 815. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

For purposes of description, the term "packet" is intended to be broadly interpreted to include a data transmission or communication, the packaging of which may correspond to, for example, a packet, a cell, a frame, a datagram, some other type of container or unit of data, or a fragment thereof. According to various exemplary embodiments, the network congestion service may pertain to an IP version 4 (IPv4) packet flow and/or packet and an IP version 6 (IPv6) packet flow and/or packet.

What is claimed is:

1. A method comprising:
- determining, by a network device of a network, that a first communication path to another network device is congested;
- determining, by the network device, a drop packet priority value, which indicates a priority level from among multiple priority levels for which packets are not to be dropped during congestion, for a packet;
- generating, by the network device, the packet that includes the drop packet priority value;
- selecting, by the network device based on the drop packet priority value, a second communication path to the other network device; and
- transmitting, by the network device via the second communication path, the packet to the other network device.

2. The method of claim 1, wherein the drop packet priority value is included in an Options field or an Extension header field.

3. The method of claim 1, wherein the determining comprises:
- determining, by the network device, a type of control plane message to which the packet pertains.

4. The method of claim 1, wherein the determining comprises:
- determining, by the network device, a category of application to which the packet of a control plane message pertains.

5. The method of claim 1, wherein the selecting comprises:
- correlating, by the network device, the drop packet priority value to one or multiple candidate communication paths to the other network device.

6. The method of claim 1, wherein the selecting comprises:
- selecting, by the network device, the second communication path based on the drop packet priority value and a correlated congestive state of the second communication path.

7. The method of claim 1, wherein the packet further includes a security token that validates the drop packet priority value.

8. The method of claim 1, wherein the packet is a control plane message, and the drop packet priority value is included in a Type of Service (ToS) field of an Internet Protocol (IP) version 4 header or a Traffic Class (TC) field of an IP version 6 header.

9. A network device comprising:
- a processor, wherein the processor is configured to:
  - determine that a first communication path to another network device is congested;
  - determine a drop packet priority value, which indicates a priority level from among multiple priority levels for which packets are not to be dropped during congestion, for a packet;
  - generate the packet that includes the drop packet priority value;
  - select, based on the drop packet priority value, a second communication path to the other network device; and
  - transmit, via the second communication path, the packet to the other network device.

10. The network device of claim 9, wherein the drop packet priority value is included in an Options field or an Extension header field.

11. The network device of claim 9, wherein, when determining, the processor is further configured to:
- determine a type of control plane message to which the packet pertains.

12. The network device of claim 9, wherein, when determining, the processor is further configured to:
- determine a category of application to which the packet of a control plane message pertains.

13. The network device of claim 9, wherein, when selecting, the processor is further configured to:
- correlate the drop packet priority value to one or multiple candidate communication paths to the other network device.

14. The network device of claim 9, wherein, when selecting, the processor is further configured to:
- select the second communication path based on the drop packet priority value and a correlated congestive state of the second communication path.

15. The network device of claim 9, wherein the packet further includes a security token that validates the drop packet priority value.

16. The network device of claim 9, wherein the packet is a control plane message, and the drop packet priority value is included in a Type of Service (ToS) field of an Internet Protocol (IP) version 4 header or a Traffic Class (TC) field of an IP version 6 header.

17. A non-transitory computer-readable storage medium storing instructions executable by a processor of a network device that configures the network device to:
- determine that a first communication path to another network device is congested;
- determine a drop packet priority value, which indicates a priority level from among multiple priority levels for which packets are not to be dropped during congestion, for a packet;
- generate the packet that includes the drop packet priority value;
- select, based on the drop packet priority value, a second communication path to the other network device; and
- transmit, via the second communication path, the packet to the other network device.

18. The non-transitory computer-readable storage medium of claim 17, wherein the drop packet priority value is included in an Options field or an Extension header field.

19. The non-transitory computer-readable storage medium of claim 17, wherein the network device is further configured to:

determine a category of application to which the packet of a control plane message pertains.

20. The non-transitory computer-readable storage medium of claim 17, wherein the packet is a control plane message, and the drop packet priority value is included in a Type of Service (ToS) field of an Internet Protocol (IP) version 4 header or a Traffic Class (TC) field of an IP version 6 header.

* * * * *